United States Patent
Brown et al.

(10) Patent No.: US 9,900,108 B2
(45) Date of Patent: Feb. 20, 2018

(54) SINGLE LINE PASSIVE OPTICAL NETWORK CONVERTER MODULE

(71) Applicants: CommScope Connectivity UK Limited, London (GB); CommScope Technologies LLC, Hickory, NC (US); CommScope Connectivity Belgium BVBA, Kessel-Lo (BE)

(72) Inventors: David Brown, Suffolk (GB); David Mather, Cheshire (GB); Robert Neil Shaddock, Doylestown, PA (US); William Atley Weeks, Ivyland, PA (US); Joris Franckx, Bonheiden (BE); Jan Jozef Julia Maria Erreygers, Tielt-Winge (BE)

(73) Assignees: CommScope Connectivity UK Limited, London (GB); CommScope Technologies LLC, Hickory, NC (US); CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 15/033,098

(22) PCT Filed: Oct. 30, 2014

(86) PCT No.: PCT/US2014/063151
§ 371 (c)(1),
(2) Date: Apr. 28, 2016

(87) PCT Pub. No.: WO2015/066324
PCT Pub. Date: May 7, 2015

(65) Prior Publication Data
US 2016/0269125 A1 Sep. 15, 2016

Related U.S. Application Data

(60) Provisional application No. 61/899,057, filed on Nov. 1, 2013.

(51) Int. Cl.
*H04B 10/80* (2013.01)
*H04B 10/272* (2013.01)
(Continued)

(52) U.S. Cl.
CPC ......... *H04B 10/802* (2013.01); *G02B 6/3897* (2013.01); *G02B 6/4201* (2013.01);
(Continued)

(58) Field of Classification Search
None
See application file for complete search history.

(56) References Cited

U.S. PATENT DOCUMENTS

2002/0102066 A1* 8/2002 Nishita ............... G02B 6/3817
385/75
2008/0159744 A1 7/2008 Soto et al.
(Continued)

FOREIGN PATENT DOCUMENTS

EP 1279288 1/2003
WO 2011106761 9/2011

OTHER PUBLICATIONS

International Search Authority, "International Search Report and Written Opinion", "For PCT Application No. PCT/US2014/063151", dated Feb. 6, 2015, pp. 1-14.
(Continued)

*Primary Examiner* — Darren E Wolf
(74) *Attorney, Agent, or Firm* — Fogg & Powers LLC

(57) ABSTRACT

A single line converter module comprises a housing; an environmentally hardened fiber optic connector located in the housing and configured to be optically coupled to a service terminal for receiving downstream optical frames; a single electrical connector located in the housing and coupled over a metallic medium to a network terminal providing a service to respective customer premise equip-
(Continued)

ment (CPE); and an optical-to-electrical (O/E) converter located in the housing and configured to convert the downstream optical frames to an electrical signal for transmission over the metallic medium to the network terminal.

24 Claims, 5 Drawing Sheets

(51) Int. Cl.
    *H04Q 11/00*     (2006.01)
    *G02B 6/42*     (2006.01)
    *G02B 6/38*     (2006.01)
    *G02B 6/43*     (2006.01)

(52) U.S. Cl.
    CPC .............. *G02B 6/43* (2013.01); *H04B 10/272* (2013.01); *H04B 10/808* (2013.01); *H04Q 11/0067* (2013.01); *G02B 6/4269* (2013.01)

(56) References Cited

U.S. PATENT DOCUMENTS

| | | | |
|---|---|---|---|
| 2008/0168283 A1* | 7/2008 | Penning | G06F 1/263 |
| | | | 713/310 |
| 2011/0002690 A1 | 1/2011 | Anschutz | |
| 2011/0078755 A1* | 3/2011 | Dai | H04H 20/69 |
| | | | 725/111 |
| 2012/0183289 A1* | 7/2012 | Lou | H04B 10/40 |
| | | | 398/9 |
| 2013/0011142 A1 | 1/2013 | Goodson et al. | |

OTHER PUBLICATIONS

European Patent Office, "Extended European Search Report for EP Application No. 14857812.3", "Foreign ounterpart to U.S. Appl. No. 15/033,098", dated May 19, 2017, pp. 1-10, Published in: EP.

* cited by examiner

SINGLE LINE PASSIVE OPTICAL NETWORK CONVERTER MODULE

CROSS-REFERENCE TO RELATED APPLICATIONS

This Application is 371 U.S. National Stage Application, claiming priority to, and the benefit of, PCT International Application No. PCT/US2014/063151, tiled "SINGLE LINE PASSIVE OPTICAL NETWORK CONVERTER MODULE" filed on Oct. 30, 2014, which claims priority to U.S. Provisional Patent Application No. 61/899,057, titled "SINGLE LINE PASSIVE OPTICAL NETWORK CONVERTER MODULE" filed on Nov. 1, 2013.

BACKGROUND

Fiber-to-the-X (FTTX) network architectures utilize optical fiber to provide all or part of the local loop to a customer's premise. For example, Fiber-to-the-home (FTTH) network architectures utilize optical fiber as the communication media all the way to the customer's premise. FIG. 1 shows part of a conventional network architecture utilizing a Passive Optical Networks (PON), such as Gigabit PON (GPON), which includes a FTTH implementation for customer premise 115-N. In particular, the optical fiber drop cable 111-N is coupled from a service terminal 109 to an Optical Network Terminal (ONT) 113 located at the customer's premise 115-N. By using optical fiber as the communication media all the way to each customer's home, FTTH networks can be used to provide such home customers with broadband bandwidth levels associated with fiber optic communication.

However, it may be undesirable to implement FTTH for each customer. For example, installation of optical fiber at a customer's premise or home typically requires physical access to the customer's home and surrounding area in order to dig up the customer's yard and/or surrounding area for burying the fiber drop cable. Physical access to the customer's home is also typically required to terminate the optical fiber at the customer's home. Such access may be undesirable or unavailable. Thus, other fiber implementations utilize copper wiring already present in the customer's premise for at least part of the local loop. For example, as shown in FIG. 1, in Fiber-to-the-distribution point (FTTdp) implementations, a fiber optic drop cable 111-1 is coupled from the passive service terminal 109 to an Optical Network Unit (ONU) 117 at a distribution point. A distribution point is a point where multiple copper pairs arrive. Additionally, as used herein, a 'passive' device is a device which does not include electrically powered components whereas an 'active' device includes electrically powered components. The ONU 117 is typically an active multi-line unit configured to perform optical to electrical (O/E) conversion and to distribute the converted electrical signal over a plurality of copper pairs 119. Each of the copper pairs 119 is coupled to a respective customer premise 115.

Thus, FTTdp enables distribution of broadband services to customer premises for which FTTH is not available. Additionally, FTTdp enables sharing the O/E conversion function among multiple copper pairs. However, conventional FTTdp network architectures are not easily upgraded, such as when an individual customer premise is upgraded for FTTH connectivity or different transmission technologies. For example, upgrading the service to one customer premise 115 coupled to the ONU 117 may adversely affect the service of other customer premises 115 coupled to the ONU 117 while being upgraded. Hence, there is a need in the art for a fiber network architecture which enables broadband service via existing copper pairs, but which also provides a relatively easy upgrade path.

SUMMARY

In one embodiment a single line converter module is provided. The single line converter module comprises a housing; an environmentally hardened fiber optic connector located in the housing and configured to be optically coupled to a service terminal for receiving downstream optical frames; a single electrical connector located in the housing and coupled over a metallic medium to a network terminal providing a service to respective customer premise equipment (CPE); and an optical-to-electrical (O/E) converter located in the housing and configured to convert the downstream optical frames to an electrical signal for transmission over the metallic medium to the network terminal.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
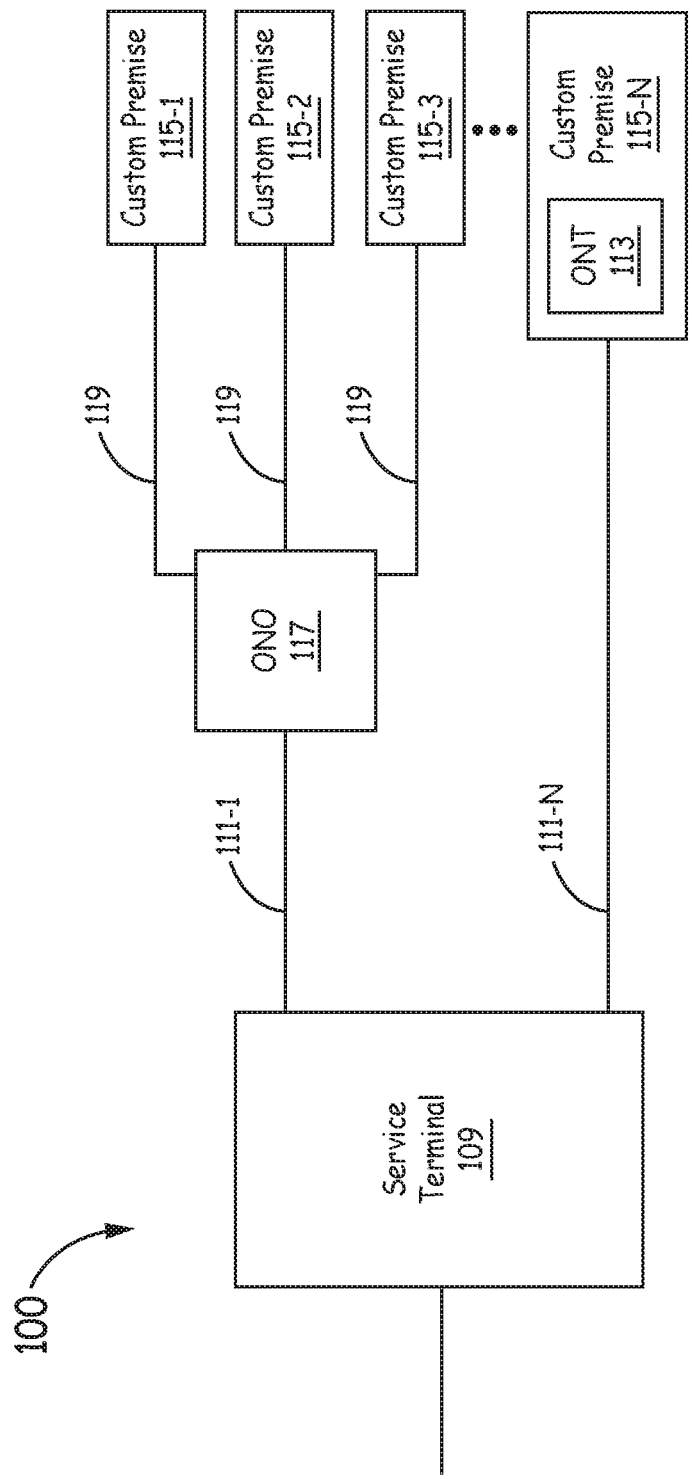
FIG. 1 is block diagram of a conventional optical fiber network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 2:
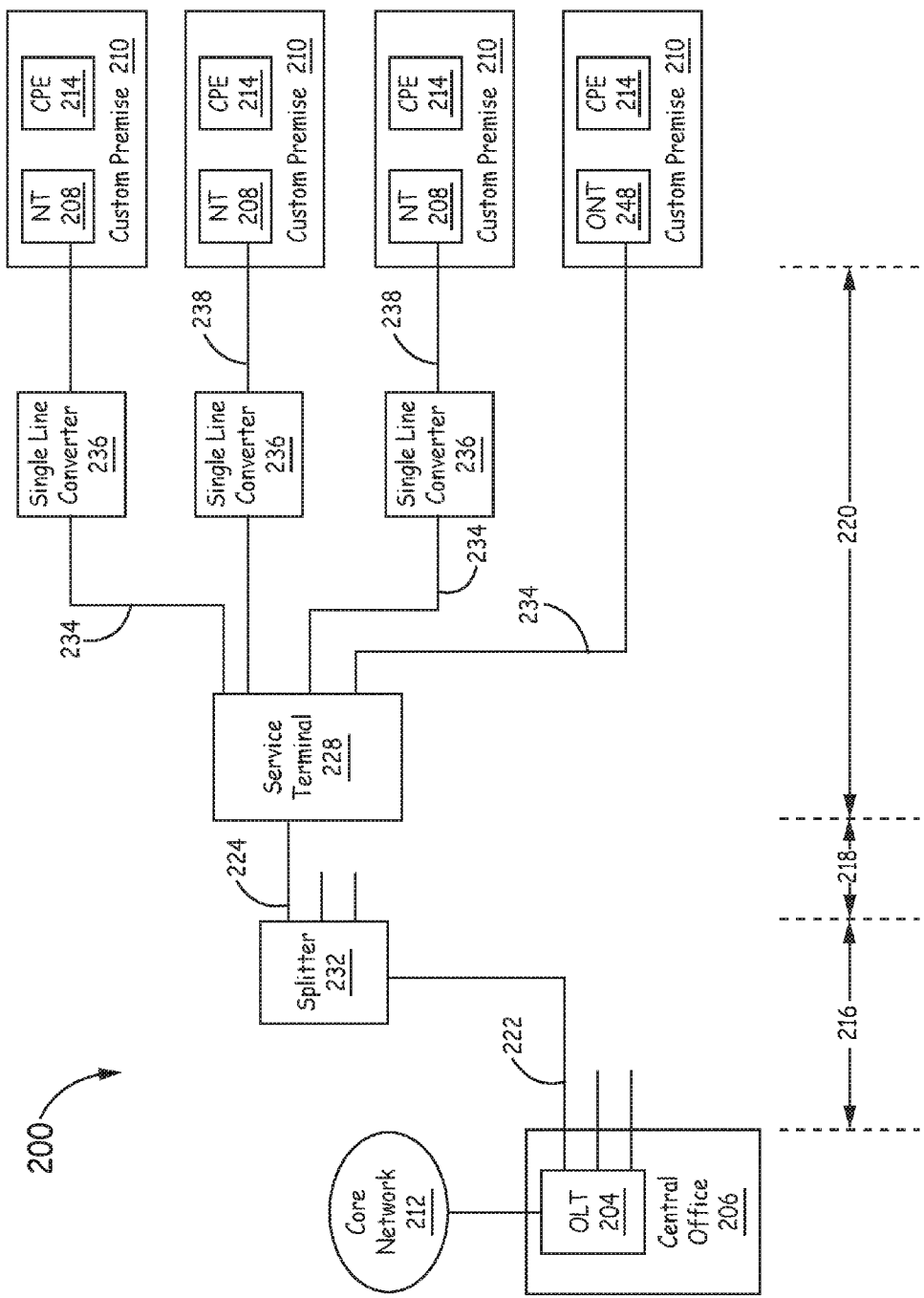
FIG. 2 is a block diagram of one embodiment of an exemplary optical fiber network utilizing single line converter modules.

FIG. 2 is high level block diagram of one embodiment of an exemplary FTTX network utilizing single line converter modules. The example network 200 shown in FIG. 2 is described here as being implemented as a point-to-multipoint passive optical network (PON), such as a Gigabit PON (GPON). In the example shown in FIG. 2, the network 200 is configured to communicatively couple an optical line terminal (OLT) 204 located in the central office (or other point of presence) 206 of a telecommunication service provider to a respective network terminal 208 in each customer premise 210.

Each OLT 204 serves as an interface and multiplexer between the service provider's core network 212 and the network 200. The service provider's core network 212 can, for example, include or be communicatively coupled to the Internet (not shown), a public switched telephone network (PSTN) (not shown), and/or a video network (not shown). The service provider's core network 212 can include other networks.

Each network terminal 208 presents the service interfaces to the customer premise equipment (CPE) 214. That is, in this embodiment, each network terminal 208 is a part of the telecommunication service provider's network and defines the demarcation point between the telecommunication service provider's network and equipment and the customer premise equipment. The services provided via the service interfaces of each network terminal 208 can include telephony (for example, plain old telephone service (POTS) or voice over IP (VOIP)), data (for example, ETHERNET or V.35), wireless local area network (for example, one or more of the Institute of Electrical and Electronics Engineers (IEEE) 802.11 family of standards, including IEEE 802.11 a/b/g/n/ac) service, and/or video.

In the example shown in FIG. 2, the network 200 includes a feeder section 216, a distribution section 218 and a drop section 220. The feeder section 216 of the network 200 is closest to the central office 206 and couples the OLT 204 to a passive optical splitter 232 via feeder cables 222. The drop section 220 is closest to the customers' premises 210 and couples the service terminal 228 to the respective network terminals 208. The distribution section 218 couples the feeder section 216 and the drop section 220 to one another. In particular, the passive optical splitter 232 is coupled to the service terminal 228 via distribution optical fibers 224.

In the example shown in FIG. 2, each optical signal transmitted from an OLT 204 to the service terminal 228 travels from the OLT 204 to a respective passive optical splitter 232 (for example, a 1-to-8 passive optical splitter, a 1-to-16 passive optical splitter, or a 1-to-32 passive optical splitter). Each passive optical splitter 232 "splits" the incoming feeder fiber 222 into a number of distribution fibers 224.

In this example, payload data for the various services provided to the customer are combined together and used to generate frames of data suitable for communication over the fiber part of the network 200. These frames are also referred to here as "optical frames". Suitable optical protocols and technology can be used for formatting the optical frames and communicating the frames over the network 200 (such as Gigabit-capable Passive Optical Network (GPON) protocols and technology as described ITU-T G.984 series Recommendations, Ten-Gigabit-capable Passive Optical Network (XGPON) protocols and technology as described in ITU-T G.987 series Recommendations, and/or GIGABIT ETHERNET protocols and technology).

Moreover, in the example shown in FIG. 2, multiple optical wavelengths are multiplexed together for communication in both the downstream and upstream directions using wavelength division multiplexing. Other types of multiplexing can also be used (instead of or in addition to wavelength division multiplexing). As used here, the "downstream" direction refers to the direction from the OLTs 104 to the customers' premises 210, and the "upstream" direction refers to the direction from the customers' premises 210 to the OLTs 204.

In the example shown in FIG. 2, in the downstream direction, each passive optical splitter 232 outputs each of the multiple downstream optical signals received on the corresponding feeder fiber 222 onto one of the distribution fibers 224. In this example, in the upstream direction, each passive optical splitter 232 outputs each of the optical signals received on the various distribution fibers 224 onto the corresponding feeder fiber 222. The passive optical splitters 232 can be deployed in various ways. For example, the passive optical splitters 232 can be deployed in fiber distribution hubs (FDH) that are configured for convenient patching or splicing of the fibers 222 and 224 to the passive optical splitters 232. The passive optical splitters 232 can also be deployed in other ways.

The feeder fibers 222 can be deployed using main or trunk cables that bundle together multiple feeder fibers 222 and branch cables that branch one or more individual feeder fibers 222 off from the main or trunk cables at various break out locations in the feeder section 216 of the network 200 (for example, to couple individual feeder fibers 222 to passive optical splitters 232). Likewise, the distribution fibers 224 can be deployed using main or trunk cables that bundle together multiple distribution fibers 224 and branch cables that branch one or more individual distribution fibers 224 off from the main or trunk cables at various break out locations in the distribution section 218 of the network 200 (for example, to couple individual distribution fibers to passive optical splitters 232 or to the service terminals 228). The feeder fibers 222 and distribution fibers 224 can also be deployed in other ways.

The service terminal 228 is a hardened outdoor fiber terminal used to terminate drop cable coupling the FTTX network 200 to the customer's premises 210. For example, the service terminal 228 can be implemented using TE Connectivity's Multiport Service Terminal (MST) or Flexible Service Terminal (FST). The service terminal 228 can also be implemented in other ways. The service terminal includes a plurality of optical ports, as discussed in more detail below. For FTTH implementations, an optical drop fiber is coupled between one of the optical ports of the service terminal 228 and an optical network terminal (ONT) 248 at the customer's premise 210, such as is shown with respect to customer premise 210-N and optical drop fiber 234.

In contrast to conventional fiber optic networks, however, network 200 does not utilize a multi-line unit, as discussed with respect to FIG. 1, for optical to electrical (O/E) conversion in implementations which include copper drop cables to customer premises. In particular, network 200 includes a plurality of single line converter modules 236, each of which is coupled to a respective optical port of the service terminal 228 via an optical drop fiber 234. Each single line converter module 236 is also coupled to a respective network terminal 208 via a respective copper drop cable 238. Although, copper drop cables are discussed in the embodiments described herein, it is to be understood that other metallic mediums can be used for the drop cable between each single line converter module 236 and the respective network terminal 208. For example, coaxial cable can be used in other embodiments.

Each single line converter module 236 includes a respective hardened outdoor housing with hardened optical and electrical connectors. In addition, each single line converter module 236 performs optical-to-electrical (O/E) conversion for a single line. Hence, each single line converter module 236 includes active circuitry for performing the O/E conversion function. The active circuitry can be powered through 'reverse power feeding', 'forward power feeding', or a combination thereof. Reverse power feeding refers to receiving power from the respective customer premise 210 via the copper drop cable 238. Forward power feeding refers to receiving power from the network side of the single line converter module 236. For example, in some such forward power feeding embodiments, the service terminal 228 is configured to have hybrid optical/copper connectors to provide both the optical signal and power to the single line converter modules 236. In other forward power feeding embodiments, a separate electrical cable is supplied over the network 200 to each single line converter module 236 for powering the active circuitry.

Each of the single line converter modules 236 can be located at varying distances between the service terminal 228 and the network terminal 208 in the respective customer's premise 210. For example, each single line converter module 236 can be located near the service terminal 228 on a pole, in a hand-hole, or in a pedestal, etc. Indeed, in some embodiments, one or more of the single line converter modules 236 are mounted directly on the connectors of the service terminal 228. For example, in some embodiments, the single line converter modules 236 are elongated devices having an integrated optical connector for mounting on the service terminal 228. Suitable optical connectors include TE Connectivity's DLX™ Fiber Optic Connector or Corning Cable Systems OptiTap connector.

Alternatively, each single line converter module 236 can be located closer to the respective customer premise 210, such as on an exterior wall of the customer's home or business. The single line converter modules 236 do not need to be located in the same location as other single line converter modules 236. For example, one or more single line converter modules 236 can be located near the service terminal 228 while other single line converter modules 236 are located near the respective customer premises 210.

Additionally, each single line converter module 236 is removable/replaceable. That is, each single line converter module 236 can be individually removed by disconnecting the corresponding fiber optic drop cable 234 and corresponding copper drop cable 238. Since, each converter module 236 provides O/E conversion for a single line, each converter module 236 can be removed without affecting operation of other single line converter modules and subsequent service to other customer premises.

Thus, the single line converter modules 236 provide an easy upgrade path on an individual port basis. For example, if a customer is prepared to migrate to FTTH service, the corresponding single line converter module 236 can be disconnected and the corresponding fiber optic drop cable 234 can be run from the service terminal 228 to the corresponding customer premise 210. Additionally, as opposed to service terminals in conventional FTTX networks which typically have fewer fiber optic ports then the number of customer premises coupled to the service terminal, the service terminal 228 of network is configured, in some embodiments, to have the same number of fiber optic ports as customer premises coupled to the service terminal 228. Thus, the network 200 is prepared to implement FTTH for each customer premise 210 by removing the corresponding single line converter modules without additional required upgrades to the service terminal 228 or other network infrastructure.

Similarly, if the copper pair transmission technology is upgraded or changed, the single line converter modules 236 provide an easy port-by-port upgrade path. For example, the Very-high-bit-rate digital subscriber line 2 (VDSL2) technology defined in standard ITU-T G.993.2 is a common access or transmission technology which takes advantage of existing copper wires. Another access technology being developed is commonly referred to as G.Fast and is described in Recommendation ITU-T G.9700. G.Fast claims increased speeds compared to the VDSL2 standard. Thus, if a customer upgrades equipment for G.Fast technology, a single line converter module 236 configured for VDSL2 can be replaced with a single line converter module configured for use with G.Fast technology. Alternatively, since VDSL2 and G.Fast operate in different frequency bands, one or more of the single line converter modules 236 can be configured for both access technologies and automatically detect the appropriate technology to use.

Hence, system 200 enables flexibility in deploying FTTdp and FTTH in parallel. Furthermore, the system 200 provides an easy upgrade option to upgrade transmission technology, e.g. VDSL2 to G.Fast, or to FTTH on a port-by-port basis. In addition, through the use of the single line converter modules, the accompanying infrastructure is ready for implementing FTTH for each customer premise coupled to the service terminal.

Figure 3:
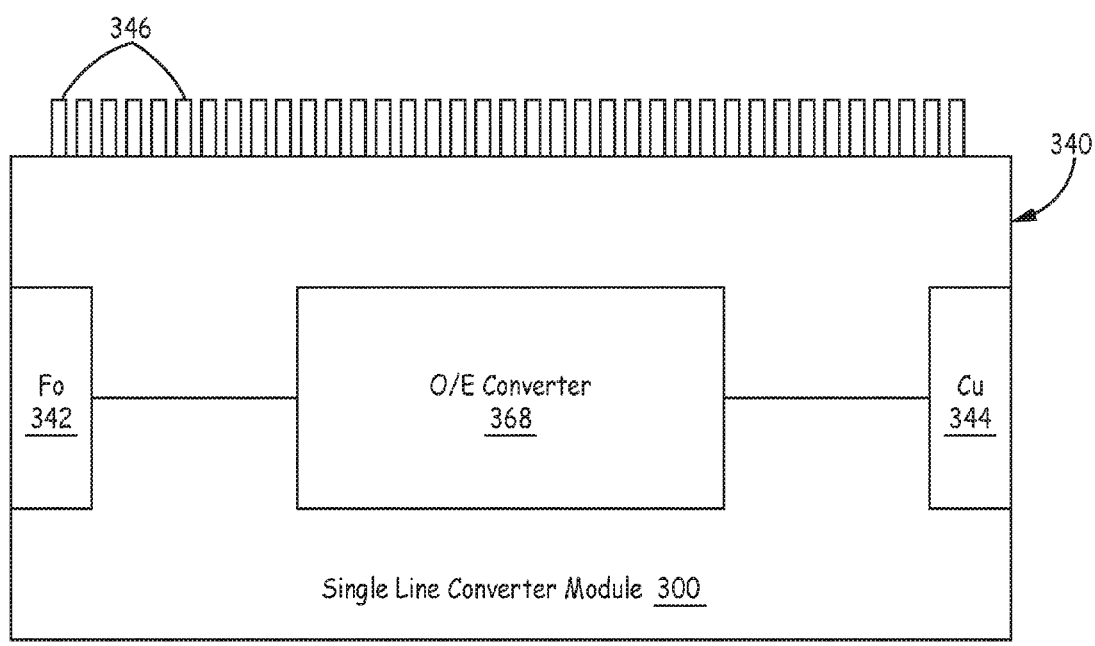
FIG. 3 is a block diagram of one embodiment of an exemplary single line converter module.

FIG. 3 is a block diagram depicting one embodiment of an exemplary single line converter module 300 for use in a FTTX network such as network 200 described above. Module 300 includes a hardened outer housing 340. The housing 340 includes elements, such as weather seals, to protect internal components from outdoor environmental conditions, such as rain, wind, snow, dust, and extreme temperatures. One exemplary suitable enclosure for the housing 340 is TE Connectivity's Optical Terminal Enclosure (OTE). In addition, the housing 340 is configured, in some embodiments, to aid heat dissipation. For example, in the example shown in FIG. 3, housing 340 includes optional fins 346 which help dissipate heat generated during the O/E conversion. In other embodiments, other heat transfer features are used in addition to or in lieu of optional fins 346 for heat management. In addition, by including a single O/E converter 368, the single line converter module 300 generates less heat than a conventional multi-line unit which further alleviates heat dissipation requirements.

The single line converter module 300 also includes a hardened fiber optic (Fo) connector 342 and an electrical connector 344, such as a copper (Cu) connector. In some embodiments, the electrical connector 344 is a hardened connector. Exemplary suitable electrical connectors include TE Connectivity's VX series connectors. A hardened connector is a connector which is manufactured for use in outdoor conditions. In other words, a hardened connector is resilient to outdoor environmental conditions and continues operating in such conditions. When the single line converter module 300 is to be replaced, a fiber optic cable is removed from the hardened fiber optic connector 342 and a twisted copper pair is disconnected from the hardened electrical connector 344. A different converter module can then be inserted in place of the converter module 300 or a fiber optic cable can be run from a service terminal to the customer premises as discussed above. Thus, the process of upgrading can be performed on an individual line or port basis for a specific customer without affecting the service provided to other customer premises. Additionally, the existing service terminal does not need to be replaced or upgraded when converting a given customer copper drop cable to a FTTH infrastructure.

Figure 4:
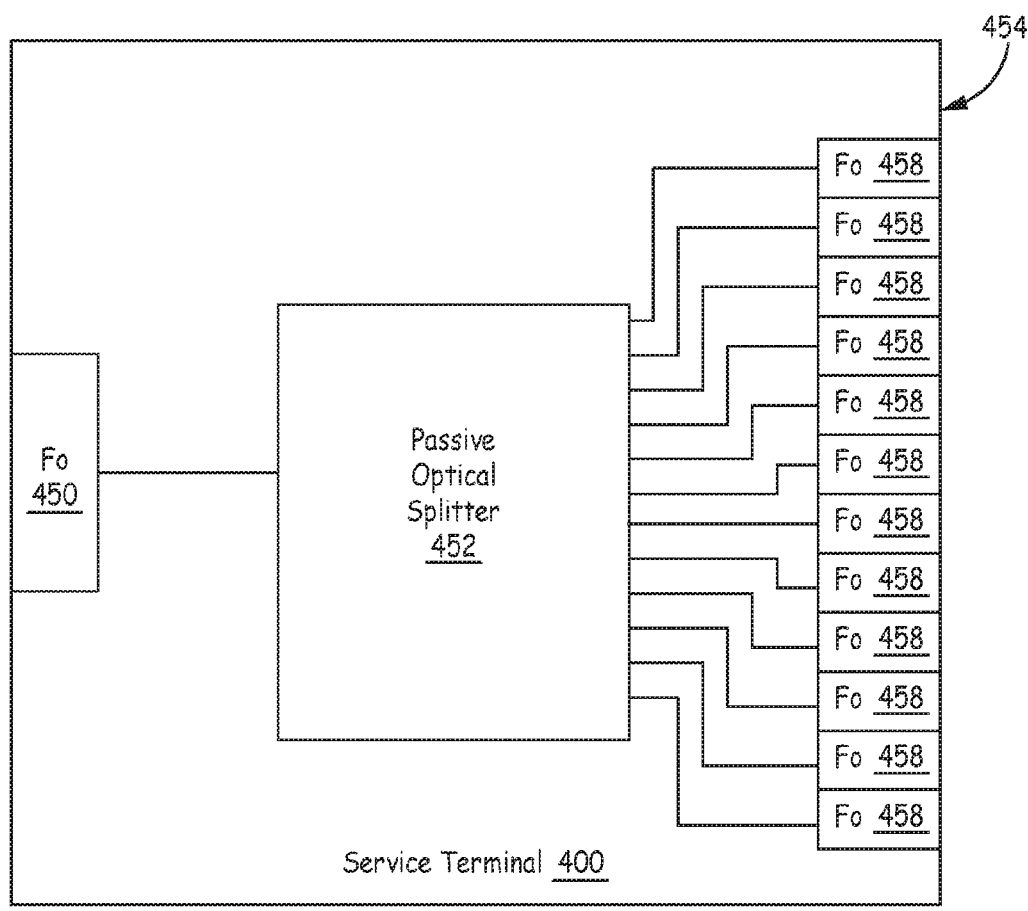
FIG. 4 is a block diagram of one embodiment of an exemplary service terminal.

FIG. 4 is a block diagram of one embodiment of a service terminal 400 for use in a FTTX network such as network 200 above. Service terminal 400 includes a fiber port 450 which is coupled to a distribution optical fiber, as discussed above. The service terminal 400 also includes a passive optical splitter 452 within housing 454. However, it is to be understood that the splitter 452 can be housed separately in other embodiments. The service terminal 400 also includes a plurality of fiber optic connectors 458 (also referred to as fiber optic drop cable ports). Although 12 fiber optic connectors 458 are shown in this example, it is to be understood that other numbers of connectors 458 can be used in other embodiments. Each of the fiber optic connectors 458 is coupled either directly to a network terminal or to a single line converter module via a fiber cable.

In addition, the number of fiber optic connectors 458 is selected to match the number of customer premises which are coupled to the service terminal 400. In contrast, typical service terminals in conventional FTTX networks have fewer fiber optic connectors than the number of customer premises which are coupled to the typical service terminal. For example, conventional FTTX networks utilize a multi-line unit which couples a plurality of customer premises to a single fiber optic connector in a corresponding service terminal. In the example of FIG. 4, however, the use of single line converter modules, as discussed above, enables matching the number of fiber optic connectors 458 to the number of customer premises coupled to the service terminal. Hence, the corresponding network infrastructure is ready for full FTTH implementation to each customer premise coupled to the service terminal 400.

Figure 5:
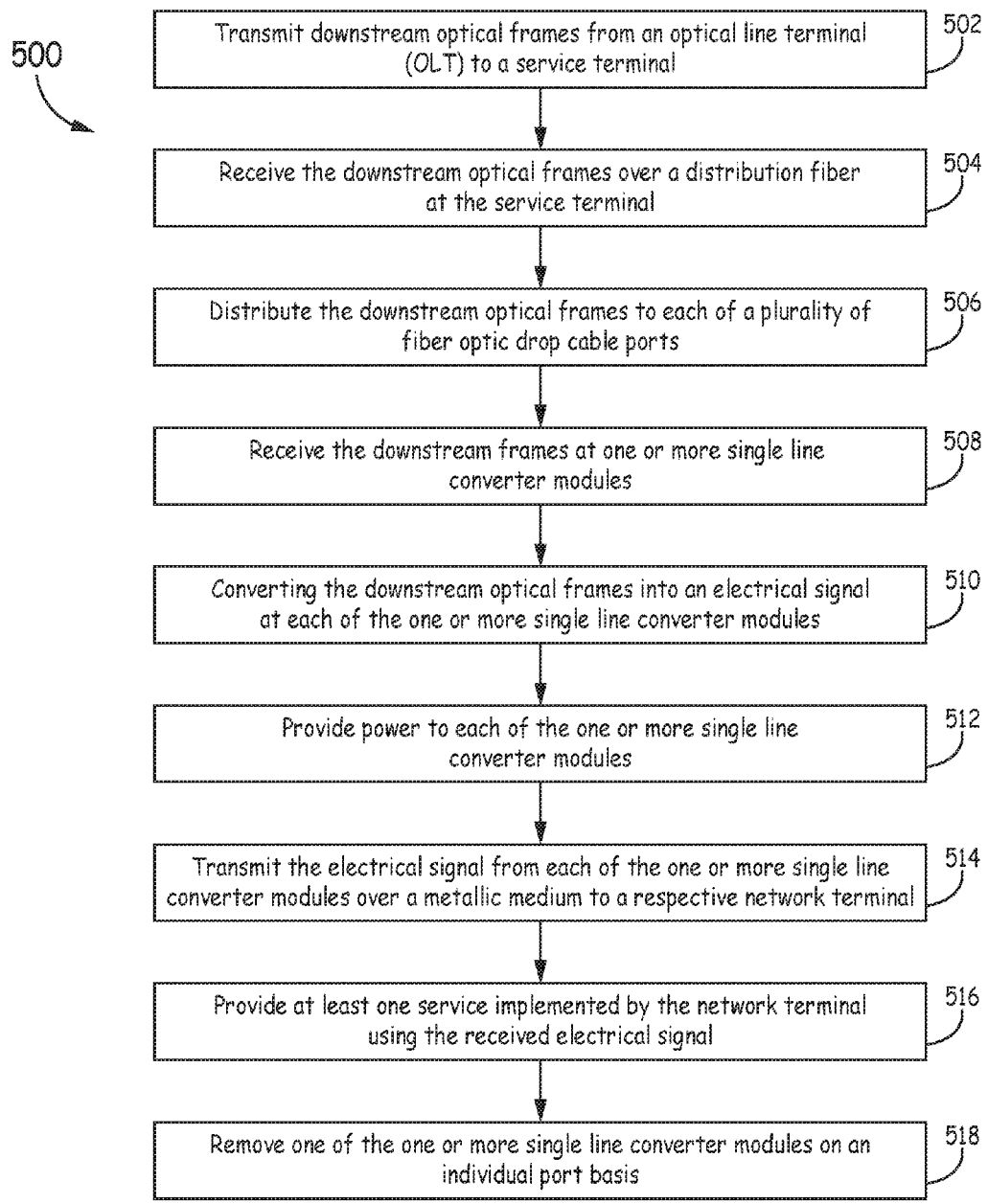
FIG. 5 is a flow chart depicting one embodiment of an exemplary method of communicating data from an OLT to a customer premise.

FIG. 5 is a flow chart depicting one embodiment of an exemplary method 500 of communicating using a passive fiber optic network such as network 200 described above. At block 502, downstream optical frames are transmitted from an optical line terminal (OLT) in the passive fiber optic network to a service terminal having a plurality of fiber optic drop cable ports, such as the service terminal 400 described above. In some embodiments, the number of fiber optic drop cable ports in the service terminal matches the total number of network terminals coupled to the service terminal either directly via Fiber or indirectly via a single line converter module. At block 504, the downstream optical frames are received over a distribution fiber at the service terminal. At block 506, the service terminal distributes the received downstream optical frames to each of the plurality of fiber optic drop cable ports.

At block 508, the downstream optical frames are received at one or more single line converter modules. Each of the one or more single line converter modules is coupled to a respective one of the plurality of fiber optic drop cable ports. At block 510, each of the one or more single line converter modules converts the downstream optical frames into an electrical signal. At block 512, power is provided to each of the one or more single line converter modules for providing the Optical/Electrical conversion. In some embodiments the power is provided over the metallic medium coupling each respective single line converter module to the respective network terminal. In other embodiments, the power is provided via the service module. For example, in some embodiments, the fiber optic drop cable connectors are hybrid fiber/electrical connectors and the power is provided over a metallic medium from the hybrid fiber/electrical connector to the respective single line converter module.

At block 514, each of the respective single line converter modules transmits the electrical signal over a metallic medium to a respective network terminal. In some embodiments, VDSL2 technology is used to transmit the electrical signals. In other embodiments, other technologies such as G.Fast are used to transmit the electrical signals. In addition, some single line converter modules can use one transmission technology while other single line converter modules implement different transmission technologies. Additionally, the metallic medium is a twisted copper pair in some embodiments. In other embodiments, other metallic media, such as coaxial cable are used.

At block 516, at least one service implemented by the network terminal is provided to customer premise equipment using the received electrical signal. Such services include, but are not limited to, voice and data services. At block 518, one of the single line converter modules is removed on an individual port basis without affecting other single line converter modules coupled to the service terminal, as discussed above.

EXAMPLE EMBODIMENTS

Example 1 includes a single line converter module comprising: a housing; an environmentally hardened fiber optic connector located in the housing and configured to be optically coupled to a service terminal for receiving downstream optical frames; a single electrical connector located in the housing and coupled over a metallic medium to a network terminal providing a service to respective customer premise equipment (CPE); and an optical-to-electrical (O/E) converter located in the housing and configured to convert the downstream optical frames to an electrical signal for transmission over the metallic medium to the network terminal.

Example 2 includes the single line converter module of Example 1, wherein the single electrical connector is an environmentally hardened electrical connector.

Example 3 includes the single line converter module of any of Examples 1-2, wherein the housing in an environmentally hardened housing.

Example 4 includes the single line converter module of any of Examples 1-3, wherein the housing includes one or more heat transfer features configured to dissipate heat generated during the O/E conversion.

Example 5 includes a passive fiber optic network comprising: an optical line terminal (OLT) to couple the passive fiber optic network to a core network; a service terminal that is optically coupled to the OLT via at least one optical fiber, the service terminal comprising a plurality of fiber optic connectors; a plurality of network terminals, each network terminal configured to provide a service to respective customer premises equipment (CPE); and at least one single line converter module, each single line converter module having an environmentally hardened optical connector coupled to a respective one of the plurality of fiber optic connectors in the service terminal via a respective optical fiber and an environmentally hardened electrical connector coupled to a respective one of the plurality of network terminals via a metallic medium, wherein each single line converter module is configured to convert optical signals received over the environmentally hardened optical connector to an electrical signal and to transmit the electrical signal over the metallic medium to the respective network terminal.

Example 6 includes the passive fiber optic network of Example 5, wherein the number of fiber optic connectors in the service terminal matches the number of network terminals coupled to the service terminal.

Example 7 includes the passive fiber optic network of any of Examples 5-6, wherein the at least one single line converter module receives power over the metallic medium coupling the at least one single line converter module to the respective network terminal.

Example 8 includes the passive fiber optic network of any of Examples 5-7, wherein each of the plurality of fiber optic connectors is a hybrid fiber/electrical connector configured to provide power to the respective single line converter module over a metallic medium coupling the hybrid fiber/electrical connector to the respective single line converter mod.

Example 9 includes the passive fiber optic network of any of Examples 5-8, wherein the at least one single line converter module is mounted on the respective fiber optic connector of the service terminal.

Example 10 includes the passive fiber optic network of any of Examples 5-9, wherein the metallic medium is copper.

Example 11 includes the passive fiber optic network of any of Examples 5-10, wherein the at least one single line converter module is configured to transmit electrical signals according to Very-high-bit-rate digital subscriber line 2 (VDSL2) technology.

Example 12 includes the passive fiber optic network of any of Examples 5-11, wherein the at least one single line converter module is configured to transmit electrical signals according to G.Fast technology.

Example 13 includes the passive fiber optic network of any of Examples 5-12, wherein the passive fiber optic network comprises at least one of a Gigabit-capable Passive Optical Network (GPON), a Ten-Gigabit-capable Passive Optical Network (XGPON), and an ETHERNET Passive Optical Network (EPON).

Example 14 includes a method of communicating using a passive fiber optic network, the method comprising: transmitting downstream optical frames from an optical line terminal (OLT) in the passive fiber optic network to a service terminal having a plurality of fiber optic drop cable ports; receiving the downstream optical frames over a distribution fiber at the service terminal; distributing the downstream optical frames to each of the plurality of fiber optic drop cable ports; receiving the downstream frames at one or more single line converter modules, each of the one or more single line converter modules coupled to a respective one of the plurality of fiber optic drop cable ports; converting the downstream optical frames into an electrical signal at each of the one or more single line converter modules; transmitting the electrical signal from each of the one or more single line converter modules over a metallic medium to a respective network terminal; and providing at least one service implemented by the network terminal using the received electrical signal.

Example 15 includes the method of Example 14, wherein the number of fiber optic drop cable ports in the service terminal matches the total number of network terminals.

Example 16 includes the method of any of Examples 14-15, further comprising: providing power to the one or more single line converter module over the metallic medium coupling each respective single line converter module to the respective network terminal.

Example 17 includes the method of any of Examples 14-16, wherein each of the plurality of fiber optic drop cable ports is a hybrid fiber/electrical connector, the method further comprising: providing power to each respective single line converter module over a metallic medium coupling the hybrid fiber/electrical connector to the respective single line converter module.

Example 18 includes the method of any of Examples 14-17, further comprising: mounting each single line converter module on the respective fiber optic drop cable port of the service terminal.

Example 19 includes the method of any of Examples 14-18, wherein transmitting the electrical signal from each of the one or more single line converter modules over the metallic medium comprises transmitting the electrical signal from each of the one or more single line converter modules over a respective twisted copper pair.

Example 20 includes the method of any of Examples 14-19, wherein transmitting the electrical signal from each of the one or more single line converter modules comprises one of: transmitting the respective electrical signal from each of the one or more single line converter modules according to Very-high-bit-rate digital subscriber line 2 (VDSL2) technology; or transmitting the respective electrical signal from each of the one or more single line converter modules according to G.Fast technology.

Example 21 includes the method of any of Examples 14-20, further comprising: removing one of the one or more single line converter modules on an individual port basis without affecting other single line converter modules coupled to a respective fiber optic drop cable port in the service terminal.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

PARTS LIST

111 Optical fiber drop cable
113 Optical network terminal
115 Customer premise
117 Optical Network Unit
119 Copper pair
200 Network
204 Optical Line Terminal
206 Central Office
208 Network Terminal
210 Customer Premise
212 Core Network
214 Customer Premise Equipment
216 Feeder Section
218 Distribution Section
220 Drop Section
222 Feeder Fiber
224 Distribution Optical Fibers
228 Service Terminal
232 Passive Optical Splitter
234 Optical Drop Fiber
236 Single Line Converter Module
238 Copper Drop Cable
300 Single Line Converter Module
340 Housing
342 Fiber Optic Connector
344 Electrical Connector
346 Fins
368 O/E Converter
400 Service Terminal
450 Fiber Port
452 Passive Optical Splitter
454 Housing
458 Fiber Optic Connector

What is claimed is:
1. A single line converter module comprising:
a housing;

a fiber optic connector located in the housing and configured to be optically coupled to a service terminal for receiving downstream optical frames;
a single electrical connector located in the housing and coupled over a metallic medium to a single network terminal providing a service to respective customer premise equipment (CPE); and
an optical-to-electrical (O/E) converter located in the housing and configured to convert the downstream optical frames for just the single network terminal to an electrical signal for transmission over the metallic medium to the single network terminal.

2. The single line converter module of claim 1, wherein one or both of the single electrical connector and the fiber optic connector is an environmentally hardened connector manufactured for use in outdoor conditions.

3. The single line converter module of claim 1, wherein the housing is an environmentally hardened housing configured for use in an outdoor environment.

4. The single line converter module of claim 1, wherein the housing includes one or more heat transfer features comprising at least heat dissipation fins configured to dissipate heat generated during the O/E conversion.

5. A passive fiber optic network comprising:
an optical line terminal (OLT) to couple the passive fiber optic network to a core network;
a service terminal that is optically coupled to the OLT via at least one optical fiber, the service terminal comprising a plurality of fiber optic connectors;
a plurality of network terminals, each network terminal configured to provide a service to respective customer premises equipment (CPE); and
at least one single line converter module, each single line converter module having an optical connector coupled to a respective one of the plurality of fiber optic connectors in the service terminal via one of the respective optical fibers and an electrical connector coupled to a respective one of the plurality of network terminals via a metallic medium, wherein each single line converter module is configured to convert optical signals received over the optical connector for just the respective one of the plurality of network terminals to an electrical signal and to transmit the electrical signal over the metallic medium to the respective network terminal.

6. The passive fiber optic network of claim 5, wherein the number of fiber optic connectors in the service terminal matches the number of network terminals coupled to the service terminal.

7. The passive fiber optic network of claim 5, wherein the at least one single line converter module receives power over the metallic medium coupling the at least one single line converter module to the respective network terminal.

8. The passive fiber optic network of claim 5, wherein each of the plurality of fiber optic connectors is a hybrid fiber/electrical connector configured to provide power to the respective single line converter module over a metallic medium coupling the hybrid fiber/electrical connector to the respective single line converter module.

9. The passive fiber optic network of claim 5, wherein the metallic medium is copper.

10. The passive fiber optic network of claim 5, wherein the at least one single line converter module is configured to transmit electrical signals according to Very-high-bit-rate digital subscriber line 2 (VDSL2) technology.

11. The passive fiber optic network of claim 5, wherein the at least one single line converter module is configured to transmit electrical signals according to G.Fast technology.

12. The passive fiber optic network of claim 5, wherein the passive fiber optic network comprises at least one of a Gigabit-capable Passive Optical Network (GPON), a Ten-Gigabit-capable Passive Optical Network (XGPON), and an ETHERNET Passive Optical Network (EPON).

13. A method of communicating using a passive fiber optic network, the method comprising:
transmitting downstream optical frames from an optical line terminal (OLT) in the passive fiber optic network to a service terminal having a plurality of fiber optic drop cable ports;
receiving the downstream optical frames over a distribution fiber at the service terminal;
distributing the downstream optical frames to each of the plurality of fiber optic drop cable ports;
receiving the downstream frames at one or more single line converter modules, each of the one or more single line converter modules coupled to a respective one of the plurality of fiber optic drop cable ports;
at each of the one or more single line converter modules, converting the downstream optical frames for just one respective network terminal into an electrical signal;
transmitting the electrical signal from each of the one or more single line converter modules over a metallic medium to the respective network terminal; and
providing at least one service implemented by the respective network terminal using the received electrical signal.

14. The method of claim 13, wherein the number of fiber optic drop cable ports in the service terminal matches the total number of network terminals.

15. The method of claim 13, further comprising:
providing power to the one or more single line converter module over the metallic medium coupling each respective single line converter module to the respective network terminal.

16. The method of claim 13, wherein each of the plurality of fiber optic drop cable ports is a hybrid fiber/electrical connector, the method further comprising:
providing power to each respective single line converter module over a metallic medium coupling the hybrid fiber/electrical connector to the respective single line converter module.

17. The method of claim 13, wherein transmitting the electrical signal from each of the one or more single line converter modules over the metallic medium comprises transmitting the electrical signal from each of the one or more single line converter modules over a respective twisted copper pair.

18. The method of claim 13, wherein transmitting the electrical signal from each of the one or more single line converter modules comprises one of:
transmitting the respective electrical signal from each of the one or more single line converter modules according to Very-high-bit-rate digital subscriber line 2 (VDSL2) technology; or
transmitting the respective electrical signal from each of the one or more single line converter modules according to G.Fast technology.

19. The method of claim 13, further comprising:
removing one of the one or more single line converter modules on an individual port basis without affecting other single line converter modules coupled to a respective fiber optic drop cable port in the service terminal.

20. A conversion module comprising:
a housing;
an optical-to-electrical (O/E) converter located in the housing and configured to convert an optical signal to an electrical signal;
a fiber optic cable coupled to the housing and in communication with the O/E converter;
a fiber optic connector coupled to the fiber optic cable; and
at least one twisted copper conductor pair in communication with the O/E converter and extending from the housing, wherein the at least one twisted copper conductor pair is capable of transmitting electrical signals from the O/E converter and receiving power for powering the O/E converter.

21. The conversion module of claim 20, wherein the housing comprises an environmentally hardened housing manufactured for use in outdoor conditions and that includes one or more heat transfer features comprising at least heat dissipation fins.

22. The conversion module of claim 20, wherein the fiber optic connector comprises a hardened fiber optic connector manufactured for use in outdoor conditions.

23. The conversion module of claim 20, further comprising a hardened electrical connector manufactured for use in outdoor conditions coupled to the at least one twisted copper conductor pair.

24. The conversion module of claim 20, wherein the housing comprises an environmentally hardened housing that includes a weather seal configured to protect an interior of the environmentally hardened housing from outdoor environmental conditions.

* * * * *